United States Patent [19]

Ichikawa et al.

[11] Patent Number: 4,935,815
[45] Date of Patent: Jun. 19, 1990

[54] SCANCONVERTER SYSTEM WITH SUPERIMPOSING APPARATUS

[75] Inventors: Takahiro Ichikawa; Mitsunobu Fujikawa; Yasuo Takeshima, all of Kanagawa, Japan

[73] Assignee: Sony Corporation, Tokyo, Japan

[21] Appl. No.: 372,754

[22] Filed: Jun. 29, 1989

[30] Foreign Application Priority Data

Jul. 5, 1988 [JP] Japan ................................ 63-165966

[51] Int. Cl.⁵ .............................................. H04N 7/01
[52] U.S. Cl. .................................... 358/140; 358/105; 358/183
[58] Field of Search ................. 358/140, 183, 105, 22, 358/167, 181, 11; 364/521

[56] References Cited

U.S. PATENT DOCUMENTS

| 4,272,787 | 6/1981 | Michael et al. | 358/160 |
| 4,400,719 | 8/1983 | Powers | 358/140 X |
| 4,403,250 | 9/1983 | Kellar | 358/105 |
| 4,698,676 | 10/1987 | Kubota et al. | 358/140 |

FOREIGN PATENT DOCUMENTS 0130295 7/1985 Japan ...................... 358/11

Primary Examiner—James J. Groody
Assistant Examiner—Victor R. Kostak
Attorney, Agent, or Firm—Ronald P. Kananen

[57] ABSTRACT

A scanconverter system with a superimposing apparatus for converting an interlaced video signal to a non-interlaced video signal and forming desired image data by superimposing a computer-generated image on another image reproduced from a laser disc or the like. The system comprises a write clock generator for generating a write clock of a predetermined frequency, a read clock generator for generating a read clock of a double frequency, a line memory unit for storing a horizontal line of an interlaced digital video signal and outputting a first non-interlaced digital video signal, a frame memory unit for storing a frame of the interlaced digital video signal and outputting a second non-interlaced digital video signal, a detector for detecting whether the interlaced digital video signal represents a still picture or not, and a selector for selecting one of the first and second non-interlaced digital video signals according to the output of the detector. Selection of the first or second non-interlaced digital video signal depends on whether the interlaced digital video signal represents a still picture or not.

8 Claims, 2 Drawing Sheets

SCANCONVERTER SYSTEM WITH SUPERIMPOSING APPARATUS

BACKGROUND OF THE INVENTION

1. Field of the Invention

The present invention relates to a scanconverter system designed to convert an interlaced video signal to a non-interlaced video signal and equipped with a superimposing apparatus for forming desired image data by superimposing a computer-generated image on another image reproduced from a laser disc or the like.

2. Description of the Prior Art

There is known a superimposing apparatus which forms desired image data by superimposing a computer-generated image of characters, graphics and so forth on another image formed of video signals reproduced from a laser disc, video tape or the like. Generally in the apparatus of the type mentioned, video signals supplied from an external apparatus are first digitized and then are replaced partially with computer-generated image data to form interlaced superimposed image data.

In such conventional superimposing apparatus where interlaced superimposed image data is outputted, some problems are existent including a low image resolution and flicker on a display to consequently bring about difficulties in reading superimposed characters and so forth. For the purpose of solving the above problems, there is contrived a technique for processing the interlaced image data to form non-interlaced image data with the superimposition and outputting such non-interlaced image data.

In processing the interlaced image data to obtain non-interlaced image data, interpolation of scanning lines is performed by the use of a line memory unit or a frame memory unit, and a variety of devices have been proposed and developed for practical use to achieve the above purpose. However, if the interlaced superimposed image data outputted from such conventional superimposing apparatus is processed to form non-interlaced image data by merely using a line memory unit or a frame memory unit, there still remain some difficulties in sufficiently enhancing the image resolution and reducing the flicker without causing a visually unnatural impression.

When the interlaced superimposed image data outputted from the superimposing apparatus represents a still picture, satisfactory interpolation is attained by the use of a frame memory unit to produce non-interlaced image data. However, if a line memory unit is employed in such a case, it follows that the image data of a horizontal scanning line to be interpolated is composed of the data of the preceding horizontal scanning line, whereby vertical flicker is caused on a display screen to consequently deteriorate the vertical resolution. Accordingly, the computer-generated image data is not suited to form a non-interlaced one by the use of a line memory unit. When the interlaced superimposed image data outputted from the superimposing apparatus represents a moving picture, satisfactory interpolation can be executed by means of a line memory unit to form non-interlaced image data. However, if a frame memory unit is used for obtaining interlaced data, the image data of horizontal scanning line to be interpolated comes to be composed of the image data anterior by one or two fields, so that some visually unnatural impression is derived from the image displayed on the screen. Therefore, the image data thus formed of the moving-picture video signal is not suited for obtaining non-interlaced data by the use of a frame memory unit.

OBJECT AND SUMMARY OF THE INVENTION

The present invention has been accomplished in view of the problems mentioned above. Its object resides in providing an improved scanconverter system with a superimposing apparatus of a novel constitution which is capable of producing satisfactory non-interlaced image data while eliminating flicker of the image on a display and averting a visually unnatural impression thereof.

In such superimposing apparatus for forming desired image data by superimposing a computer-generated image on another image reproduced from a laser disc or the like, the feature of the present invention exists in the provision of two image data selectors for forming image data to be superimposed, and a line memory unit and a frame memory unit from which interlaced image data are read out as non-interlaced image data, wherein optimal non-interlaced superimposed image data are outputted regardless of whether the image reproduced from a laser disc or the like is a still picture or a moving picture, thereby removing flicker of the image as well as preventing any visually unnatural impression.

When a video signal of a still picture is supplied, a first superimpose image data formed by the first image data selector is read out as non-interlaced image data from a frame memory unit and then is outputted via a second image data selector. Meanwhile, when a video signal of a moving picture is supplied, there is formed and outputted from the second image data selector the second superimpose image data which is obtained out of both the video-signal image data read out as non-interlaced image data from the line memory unit and the first superimpose image data read out from the frame memory unit, by replacing the video-signal image data with the computer-generated image data for the first superimpose image data.

According to one aspect of the present invention, there is provided a scanconverter system with a superimposing apparatus for converting an interlaced video signal to a non-interlaced video signal. The system comprises write clock generator means for generating a write clock having a predetermined frequency; read clock generator means for generating a read clock having a double frequency; line memory means for storing a horizontal line of an interlaced digital video signal and outputting a first non-interlaced digital video signal, the interlaced digital video signal being written in the line memory means in accordance with the write clock and being read therefrom in accordance with the read clock; frame memory means for storing a frame of the interlaced digital video signal and outputting a second non-interlaced digital video signal, the interlaced digital video signal being written in the frame memory means in accordance with the write clock and being read therefrom in accordance with the read clock; detector means for detecting whether the interlaced digital video signal represents a still picture or not; and selector means for selecting one of the first and second non-interlaced digital video signals according to the output of the detector means, in such a manner as to select the first non-interlaced digital video signal when the output of the detector means indicates that the interlaced digital video signal represents a still picture, or to select the second non-interlaced digital video signal when the output of the detector means indicates that the interlaced digital video signal does not represent a still picture.

Many other advantages and features of the invention will become manifest to those versed in the art upon making reference to the detailed description and the accompanying drawings in which a preferred embodiment of the invention is shown by way of illustrative example.

DETAILED DESCRIPTION OF THE PREFERRED EMBODIMENT

Hereinafter a preferred embodiment of the present invention will be described specifically with reference to the accompanying drawings.

Figure 1:
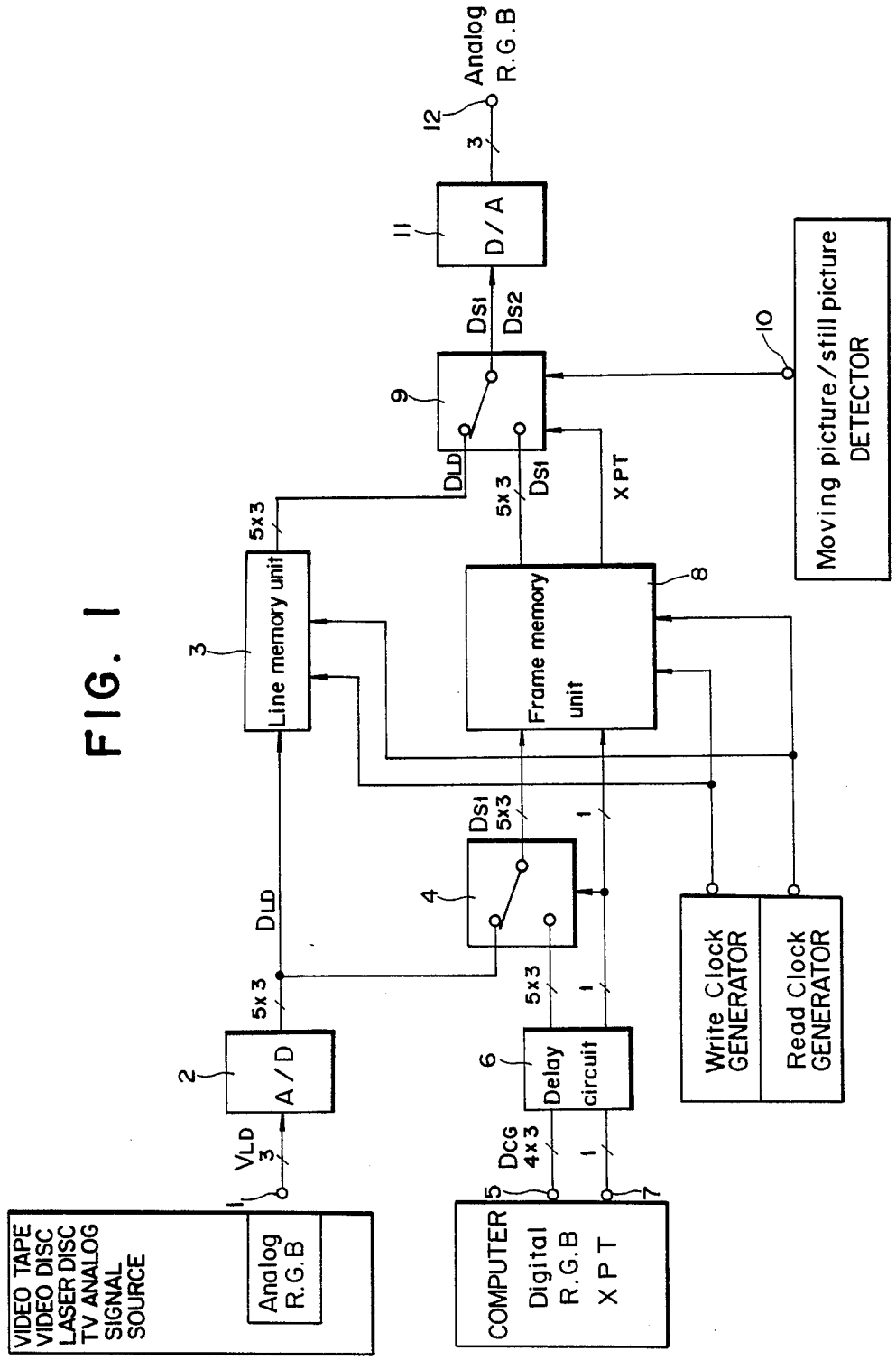
FIG. 1 is a block diagram of an exemplary scanconverter system with a superimposing apparatus embodying the present invention.

FIG. 1 is a block diagram of an exemplary scanconverter system with a superimposing apparatus embodying the present invention.

In FIG. 1, an analog R-G-B input terminal 1 is fed with interlaced analog video signals $V_{LD}$ reproduced from an unshown laser disc and converted into three primary color signals of red (R), green (G) and blue (B). Meanwhile a digital R-G-B input terminal 5 is fed with interlaced image data $D_{CG}$ of red, green and blue signals, each composed of 4 bits and formed by an unshown computer. An image selection data input terminal 7 is fed with 1-bit image selection data XPT formed also by the computer together with the image data $D_{CG}$. The image data acts as a key signal for a generator therefor in a computer connected to the terminal 7. The image selection data XPT signifies that the image data $D_{CG}$ represents an image to be superimposed. The analog video signals $V_{LD}$ supplied to the analog R-G-B input terminal 1 may be, besides those reproduced from the aforementioned laser disc, signals reproduced from a video tape or the like or those obtained from a television broadcast.

The analog video signals $V_{LD}$ supplied to the analog R-G-B input terminal 1 are digitized into 5-bit red, green and blue image data $D_{LD}$ by an analog-to-digital (A/D) converter 2 and then are supplied to both a line memory unit 3 and a first image data selector 4. Meanwhile the image data $D_{CG}$ supplied to the digital R-G-B input terminal 5 are supplied to a delay circuit 6 which serves to delay the data $D_{CG}$ for synchronizing the same with the image data $D_{LD}$ outputted from the A/D converter 2. Low (L) data of one bit is added to the least significant bit (LSB) to form 5-bit red, green and blue image data, which are then supplied to the first image data selector 4. Meanwhile the image selection data XPT fed to the input terminal 7 is supplied to the delay circuit 6 so as to be delayed for a time equal to that of the image data $D_{CG}$, and then is supplied to both the first image data selector 4 and the frame memory unit 8.

Figure 2A:
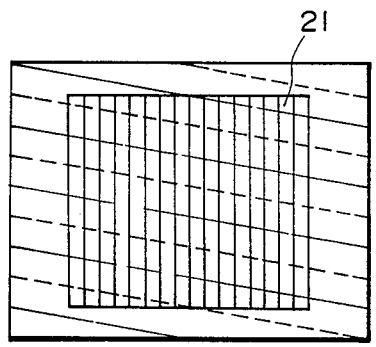
FIGS. 2A through 2C schematically illustrate the operation of a first image data selector employed in the embodiment of the invention.
Figure 2B:
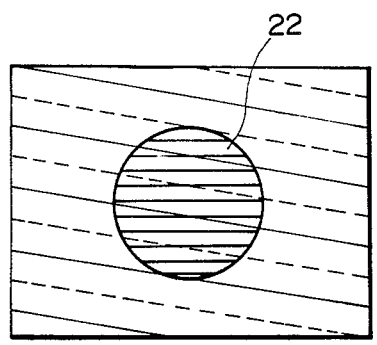
Figure 2C:
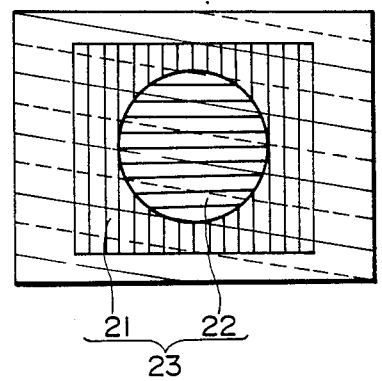

When the image data $D_{CG}$ supplied from the delay circuit 6 to the first image data selector 4 in accordance with the image selection data XPT represents an image to be superimposed, the image data $D_{LD}$ received via the A/D converter 2 is outputted in place of the image data $D_{CG}$ from the first image data selector 4. And in any other case, the image data $D_{CG}$ is outputted. For example, the first image data selector 4 forms and outputs superimposed image data $D_{S1}$ of FIG. 2C where an image 22 of FIG. 2B formed by the image data $D_{CG}$ is superimposed on an image 21 of FIG. 2A formed by the image data $D_{LD}$. The superimposed image data $D_{S1}$ outputted from the first image data selector 4 is supplied to the frame memory unit 8. When no superimposition is performed in this apparatus, merely the image data $D_{LD}$ alone is outputted from the first image data selector 4.

The line memory unit 3 is so constituted as to be adapted for asynchronously writing or reading the image data of one horizontal scanning line. Meanwhile the frame memory unit 8 consists of a memory for writing odd-field image data and another memory for writing even-field image data. Each of such line memory unit 3 and frame memory unit 8 is fed with a write clock signal having a frequency of 16 MHz and a read clock signal having a double frequency of 32 MHz which correspond respectively to the image data $D_{LD}$ and $D_{S1}$. In the line memory unit 3, the image data $D_{LD}$ supplied from the A/D converter 2 is written synchronously with the write clock signal, and the image data of one horizontal scanning line thus written is read out twice at a double speed synchronously with the read clock signal. Meanwhile in the frame memory unit 8, both the image data $D_{S1}$ formed by the first image selector 4 and the image selection data XPT are written synchronously with the write clock signal, and the odd-field image data of one horizontal scanning line and the even-field image data thereof are read out alternately from the respective memories synchronously with the read clock signal at a double speed. It follows therefore that the interlaced image data $D_{LD}$ and $D_{S1}$ supplied are read out respectively from the line memory unit 3 and the frame memory unit 8 at the double speed synchronously with the read clock signal and then are outputted as non-interlaced image data $D_{LD}$ and $D_{S1}$. Such output image data $D_{LD}$ and $D_{S1}$ are supplied to the second image data selector 9.

The second image data selector 9 receives, in addition to the image data $D_{LD}$ and $D_{S1}$, the image selection data XPT read out from the frame memory unit 8 with the same timing as the image data $D_{S1}$, and also receives reproduction mode data which is obtained via a reproduction mode data input terminal 10 and is indicative of whether the analog video signal $V_{LD}$ represents a moving picture or a still picture. The reproduction mode data signifies a moving picture when the laser disc for the analog video signal $V_{LD}$ is placed in a normal reproduction or playback mode, or signifies a still picture when the laser disc is in a still reproduction mode. In case the input data is a video signal received from a video reproducing apparatus in a normal playback mode, detection is executed as to whether any moving component is existent or not in the image, and if there is none of moving component, the signal may be processed as a still picture.

Figure 3A:
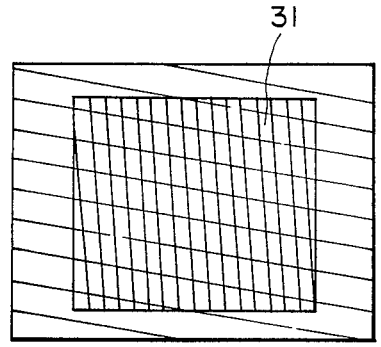
FIGS. 3A through 3C schematically illustrate the operation of a second image data selector employed in the embodiment of the invention.
Figure 3B:
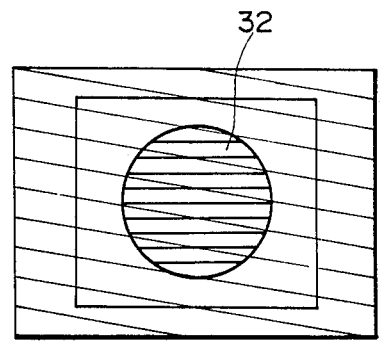
Figure 3C:
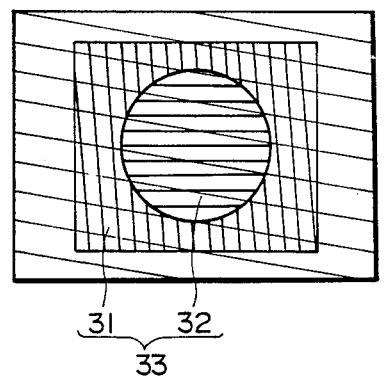

When the analog video signal $V_{LD}$ is identified to represent a moving picture in accordance with the reproduction mode data, the second image data selector 9 outputs merely the computer-generated image data $D_{CG}$ indicated by the image selection data XPT out of the image data $D_{S1}$ supplied from the frame memory unit 8. In any other case, the second image data selector 9 outputs the video data $D_{LD}$. According to this data selector 9, superimposed image data $D_{S2}$ for forming a superimposed image 33 of FIG. 3C is outputted through superimposition of an image 32, which is formed by the image data $D_{CG}$ out of the entire image of FIG. 3B formed by the image data $D_{S1}$, on an image 31 of FIG. 3A formed by the image data $D_{LD}$. Meanwhile, when the analog video signal $V_{LD}$ is identified to represent a still picture in accordance with the reproduction mode data, the second image data selector 9 so functions, regardless of the image selection data XPT, as to output the image data $D_{S1}$ supplied from the frame memory unit 8. In a state where no superimposition is performed in this apparatus, the second video data selector 9 provides merely the image data $D_{LD}$ read out from the line memory unit 3 if the received video signal is identified to represent a moving picture in accordance with the reproduction mode data, or provides merely the image data $D_{S1}$ read out from the frame memory unit 8 if the video signal is identified to represent a still picture in accordance with such reproduction mode data.

The image data $D_{S1}$ and $D_{S2}$ outputted from the second image data selector 9 are converted into analog R, G and B signals by a digital-to-analog (D/A) converter 11 and then are outputted via an analog R-G-B output terminal 12.

Thus, in this embodiment of the superimposing apparatus, when the analog video signal $V_{LD}$ of a still picture is fed to the analog R-G-B input terminal 1, the superimpose image data $D_{S1}$ formed by the first image data selector 4 is read out as non-interlaced image data from the frame memory unit 8 and then is outputted via the second image data selector 9. Meanwhile, when the analog video signal $V_{LD}$ of a moving picture is fed to the analog R-G-B input terminal 1, there is formed and outputted from the second image data selector 9 the superimpose image data $D_{S2}$ which is obtained out of both the non-interlaced image data $D_{LD}$ read out from the line memory unit 3 and the superimpose image data $D_{S1}$ read out from the frame memory unit 8, by replacing the image data $D_{LD}$ of the analog video signal $V_{LD}$ with the computer-generated image data $D_{CG}$ for the superimpose image data $D_{S1}$.

Therefore, regardless of whether the analog video signal $V_{LD}$ represents a moving picture or a still picture in the superimposing apparatus of this embodiment, the computer-generated image data is read out from the frame memory unit 8 while the image data of the moving-picture analog video signal $V_{LD}$ is read out from the line memory unit 3, and the image data of the still-picture analog video signal $V_{LD}$ is read out from the frame memory 8, so that it becomes possible to obtain superimpose image data $D_{S1}$ and $D_{S2}$ for forming adequate superimposed images which are free from flicker and cause no visually unnatural impressions. Since the superimpose image data thus obtained are formed by the digital signal processing as mentioned above, the image displayed on the screen is remarkably distinct and satisfactory.

Furthermore, in the superimposing apparatus of this embodiment where the superimpose image data $D_{S1}$ is read out from the frame memory unit 8, if the image data $D_{LD}$ is replaced with the image data $D_{S1}$ by the second image selector 9 when the analog video signal $V_{LD}$ represents a moving picture, there arises no problem of data dropout with regard to the image data in the replaced portion thereof.

In addition, the line memory unit 3 and the frame memory unit 8 are so constituted that the image data $D_{LD}$ and $D_{S1}$ are continuously written therein respectively, so that the image data $D_{S1}$ can be obtained immediately from the frame memory unit 8 if the data reading operation is switched from the line memory unit 3 to the frame memory unit 8 by the second image data selector 9.

In this superimposing apparatus, it is rendered possible to output a still picture even in a laser-disc search or fast reproduction mode by halting the operation of writing the image data $D_{S1}$ in the frame memory unit 8 and repeating the operation of reading the same image data $D_{S1}$.

Further in the superimposing apparatus mentioned, satisfactory non-interlaced image data of an enhanced vertical resolution can be outputted by writing the image data $D_{S1}$ merely in one of the two field memories of the memory unit 8 (e.g. in the even-field memory alone) and reading out the image data $D_{S1}$ of one horizontal scanning line twice from the same memory.

According to the superimposing apparatus of the present invention, when a video signal of a still picture is supplied as described hereinabove, first superimpose image data formed by the first image data selector is read out as non-interlaced image data from the frame memory unit and then is outputted via the second image data selector. Meanwhile, when video signal of a moving picture is supplied, there is formed and outputted from the second image data selector the second superimpose image data which is obtained out of both the video-signal image data read out as the non-interlaced image data from the line memory unit and the first superimpose image data read out from the frame memory unit, by replacing the video-signal image data with the computer-generated image data for the first superimpose image data.

Consequently, in the superimposing apparatus of the present invention, regardless of whether the video signal reproduced from a laser disc or the like represents a moving picture or a still picture, the computer-generated image data is read out from the frame memory unit, and the image data of the moving-picture video signal is read out from the line memory unit while the image data of the still-picture video signal is read out from the frame memory unit. Therefore, the use of such superimposing apparatus realizes adequate superimpose image data for forming satisfactory superimposed images without flicker on the display while averting visually unnatural impression. Furthermore, since such superimpose image data are obtained by digital signal processing, the images displayed on the screen are remarkably distinct with high quality.

Besides the above, in the superimposing apparatus of the present invention so constituted that the first superimpose image data is read out from the frame memory unit, the second image data selector functions in case the video signal represents a moving picture, hence preventing dropout of the image data in the replaced portion thereof.

In addition, since the individual image data are continuously written in the line memory unit and the frame memory unit respectively, the first superimpose image data can be obtained immediately from the frame memory unit if the data reading operation is switched from the line memory unit to the frame memory unit by the second image data selector.

What is claimed is:

1. A scancoverter system for converting an interlaced video signal to a non-interlaced video signal, comprising:

write clock generator means for generating a write clock having a predetermined frequency f;

read clock generator means for generating a read clock having a frequency 2f;

frame memory means for storing a frame of said interlaced digital video signal and outputting a first non-interlaced digital video signal, said first interlaced digital video signal being written in said frame memory means in accordance with said write clock and being read therefrom in accordance with said read clock;

line memory means for storing a horizontal line of an interlaced digital video signal and outputting a second non-interlaced digital video signal, said second interlaced digital video signal being written in said line memory means in accordance with said write clock and being read therefrom in accordance with said read clock;

detector means for detecting whether said interlaced digital video signal represents a still picture for not; and selector means for selecting one of said first and second non-interlaced digital video signals according to the output of said detector means, in such a manner as to select said first non-interlaced digital video signal when the output of said detector means indicates that said interlaced digital video signal represents a still picture, or to select said second non-interlaced digital video signal when the output of said detector means indicates that said interlaced digital video signal does not represent a still picture.

2. A scanconverter system with a superimposing apparatus for converting an interlaced video signal to a non-interlaced video signal, comprising:

write clock generator means for generating a write clock having a predetermined frequency f;

read clock generator means for generating a read clock having frequency 2f;

key signal generator means for generating a key signal;

first selector means for selecting, in response to said key signal, either an interlaced digital video signal or a computer-generated image signal supplied thereto;

frame memory means for storing a frame of said interlaced digital video signal and outputting a first non-interlaced digital video signal, said first interlaced digital video signal being written in said frame memory means in accordance with said write clock and being read therefrom in accordance with said read clock;

line memory means for storing a horizontal line of an interlaced digital video signal and outputting a second non-interlaced digital video signal, said second interlaced digital video signal being written in said line memory means in accordance with said write clock and being read therefrom in accordance with said read clock;

detector means for detecting whether said interlaced digital video signal represents a still picture or not; and second selector means for selecting one of said first and second non-interlaced digital video signals according to the output of said detector means, in such a manner as to select said first non-interlaced digital video signal when the output of said detector means indicates that said interlaced digital video signal represents a still picture, or to select said first and second non-interlaced digital video signal according to said key signal when the output of said selector means indicates that said interlaced digital video signal does not represent a still picture.

3. A scanconverter system according to claim 1, further comprising a video disc/tape player and an analog-to-digital converter, wherein said detector means detects whether said video disc/tape player is in a still play mode or not.

4. A scanconverter system according to claim 2, further comprising a video disc/tape player and an analog-to-digital converter, wherein said detector means detects whether said video disc/tape player is in a still play mode or not.

5. A scanconverter system for converting an interlaced video signal to a non-interlaced video signal, comprising:

a write clock generator means for generating a write clock having a predetermined frequency f;

a read clock generator means for generating a read clock having a frequency 2f;

a source of analog video signals converted into digital video signals representative of same and written into a line memory means in accordance with said write clock and being read therefrom in accordance with said read clock;

a frame memory means for storing a frame of said interlaced digital video signal, said interlaced digital video signal being written in said frame memory in accordance with said write clock and being read therefrom in accordance with said read clock; and selector means for receiving said video signals from said frame memory means and said line memory means and for receiving image selection data from said frame memory means, said detector means further receiving reproduction mode data from a source of reproduction mode data indicative of when the analog video signal represents either a moving picture or a still picture, said data signifying a moving picture when the analog video signal is placed in a normal reproduction or playback mode, and signifies a still picture when the signal is in a still reproduction mode.

6. The scanconverter as set forth in claim 5 above wherein when said analog signal is a video signal received from a video reproducing apparatus in a normal playback mode, and there is no moving component is said signal, said signal is processed as a still picture.

7. The scanconverter as set forth in claim 6 above wherein said analog signal is derived from a video tape recorder, a video disc, or a laser disc.

8. In a scanconverter for converting an interlaced video signal to a non-interlaced video signal, a detector for receiving a first interlaced digital video signal from a frame memory which stores a frame of an interlaced video signal in accordance with a first write clock frequency f and reads out said signal in accordance with a read clock having a frequency 2f, said detector also receiving a second interlaced digital video signal from a line memory which stores a line of an interlaced video signal in accordance with a first write clock frequency f and reads out said signal in accordance with a read clock having a frequency 2f, said selector further receiving image selection data from said frame memory; and means from providing reproduction mode data indicative of whether said analog video signal represents a moving picture or a still picture, wherein said detector detects a moving component when a moving component exists in the image, and processes said signal as a still picture when there is no moving component in said signal, even if said signal is a video signal.

* * * * *